UNITED STATES PATENT OFFICE.

OTTO DIEFFENBACH AND ADOLF SCHÄFER, OF GRIESHEIM-ON-THE-MAIN, GERMANY, ASSIGNORS TO THE FIRM OF CHEMISCHE FABRIK GRIESHEIM ELECTRON, OF FRANKFORT-ON-THE-MAIN, GERMANY.

IGNITING COMPOSITION AND METHOD OF MAKING SAME.

SPECIFICATION forming part of Letters Patent No. 727,758, dated May 12, 1903.

Application filed December 24, 1902. Serial No. 136,470. (No specimens.)

*To all whom it may concern:*

Be it known that we, OTTO DIEFFENBACH and ADOLF SCHÄFER, subjects of the German Emperor, residing and having our post-office address at 11 Hochstrasse, Griesheim-on-the-Main, Germany, have invented certain new and useful Improvements in Processes of Making Igniting Compositions and Compositions for Matches, of which the following is a specification.

The object of this invention is to provide non-poisonous and cheap igniting compositions for matches. It has already been attempted to render matches non-poisonous by using a mixture of phosphorus and sulfur in the preparation of the igniting composition. Owing to the unreliable character of a mixture of phosphorus and sulfur, another process was invented according to which the mixture of phosphorus and sulfur is replaced by a chemical combination of these two elements—namely, the phosphorus sesquisulfid. This combination of sulfur and phosphorus is somewhat unstable, and phosphorus sesquisulfid, as procurable in commerce, contains an objectionable amount of free phosphorus; but it was supposed that it was necessary that the igniting composition should contain free phosphorus to make it effectual.

Now this invention is based on the discovery that the presence of free phosphorus in the chemical combination of phosphorus and sulfur is not necessary and that in consequence it is possible to replace the phosphorus sesquisulfid hitherto used by the much cheaper compounds of sulfur and phosphorus which as commercial products never contain any free phosphorus. These compounds are the phosphorus trisulfid, ($P_2S_3$,) and the phosphorus pentasulfid, ($P_2S_5$.) Although these compounds contain much less phosphorus than does the phosphorus sesquisulfid and no free phosphorus at all, we have found that they are suitable for the manufacture of an efficient igniting composition. The aforesaid compounds of sulfur and phosphorus have, like the phosphorus sesquisulfid, the disadvantage of giving off in contact with the atmosphere large amounts of sulfureted hydrogen; but this disadvantage can be obviated by adding to the said compounds while they are being ground zinc oxid, which becomes intimately mixed with them during the grinding operation. The compound of sulfur and phosphorus thus mixed with zinc oxid has lost altogether the property of evolving sulfureted hydrogen. Zinc oxid has already been used in the manufacture of an igniting composition, (German Patent No. 101,736;) but the zinc oxid was added to the whole mixture and only served to thin down the mass and promote the evolution of oxygen when lighting the match, and zinc oxid has not hitherto been used to obviate the evolution of sulfureted hydrogen, which commences at the grinding operation. As much zinc oxid must be used as will insure an excess sufficient to generate oxygen when the match is used.

The following examples will show how the invention can be performed:

Example I. A mixture is obtained by grinding together one hundred parts of phosphorus trisulfid, ($P_2S_3$,) and eighty parts of zinc oxid. These one-hundred and eighty parts are mixed with two hundred parts of potassium chlorate, one hundred parts of iron oxid, and one hundred and fifty parts of ground glass and made into a paste by stirring with a solution of glue, after which the compound is applied to the matches. The simple compounds of sulfur and phosphorus are also replaced with advantage by these compounds of sulfur and phosphorus that contain also a metal, such as the hypothiophosphites and the thiophosphites. These phosphites behave in the same manner as the compounds of sulfur and phosphorus. They do not contain any free phosphorus, ignite in the igniting mass just as well as the aforesaid compounds of sulfur and phosphorus, but present over the latter the advantage that they are not decomposed by water, so that they still remain efficient if kept in damp places or even after they have been in direct contact with water. The igniting mass containing such thiosulphites is after it has been wet and then dried just as efficient as before.

Example II. A mixture consisting of one hundred and fifty parts of zinc hypothiophosphite, two hundred parts of potassium chlorate, sixty parts of iron oxid, one hundred and fifty parts of ground glass, and sixty parts of zinc oxid is made into paste by stirring in an aqueous solution of glue and then applied to the matches.

While in the claims we specify one combination of phosphorus and sulfur, it is to be understood that the other forms recited and set forth in the specification are held to be the chemical equivalents in the manner stated and to be embraced within the scope of the claims.

We claim—

1. The herein-described process of making non-poisonous igniting compositions which consists in grinding together phosphorus trisulfid and zinc oxid, mixing with such ground mixture potassium chlorate, iron oxid and ground glass in substantially the proportions specified and making a paste of the mixture by stirring and adding a solution of glue.

2. The herein-described composition for matches comprising a mixture of phosphorus trisulfid, zinc oxid, potassium chlorate, iron oxid and ground glass in substantially the proportions specified and held in a plastic form by a solution of glue.

In testimony whereof we have signed our names to this specification in the presence of two subscribing witnesses.

OTTO DIEFFENBACH.
ADOLF SCHÄFER.

Witnesses:
 FRANZ HASSLACHER,
 ERWIN DIPPEL.